June 26, 1928.
H. Y. STEBBINS
1,674,805
SIX-WHEEL ATTACHMENT FOR VEHICLES
Filed Jan. 30, 1925
3 Sheets-Sheet 1
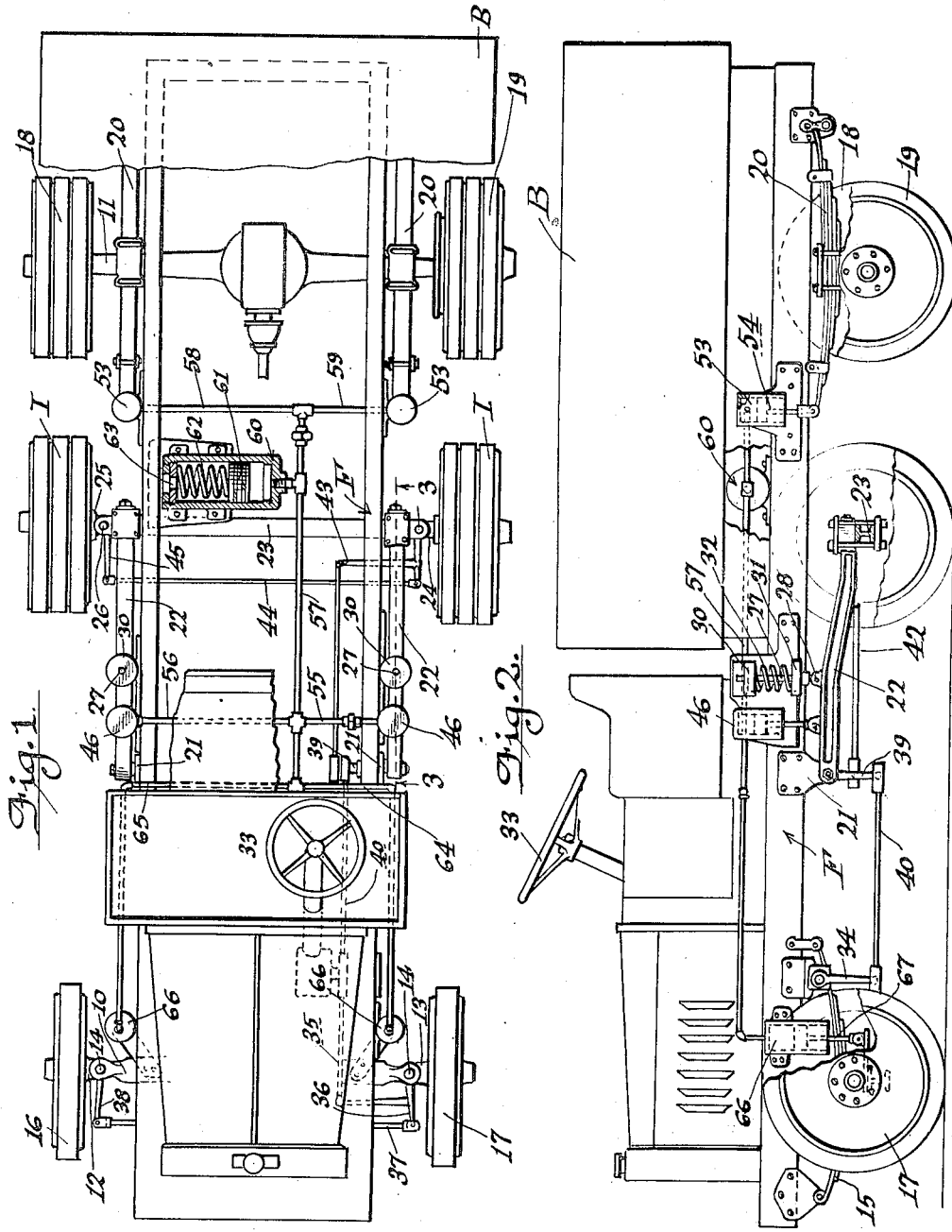
Witness:
Wm Hall
Inventor
Harry Y. Stebbins
By Hazard and Miller
Attorneys June 26, 1928.
H. Y. STEBBINS
1,674,805
SIX-WHEEL ATTACHMENT FOR VEHICLES
Filed Jan. 30, 1925   3 Sheets-Sheet 2
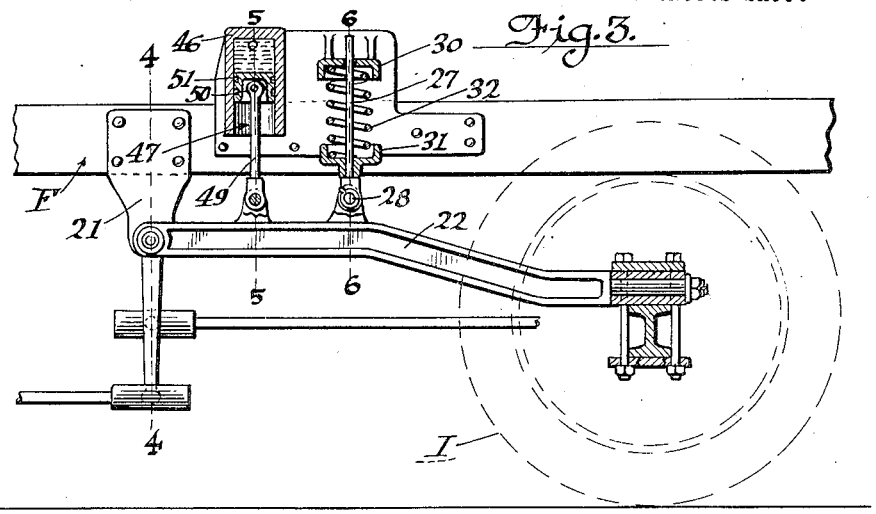
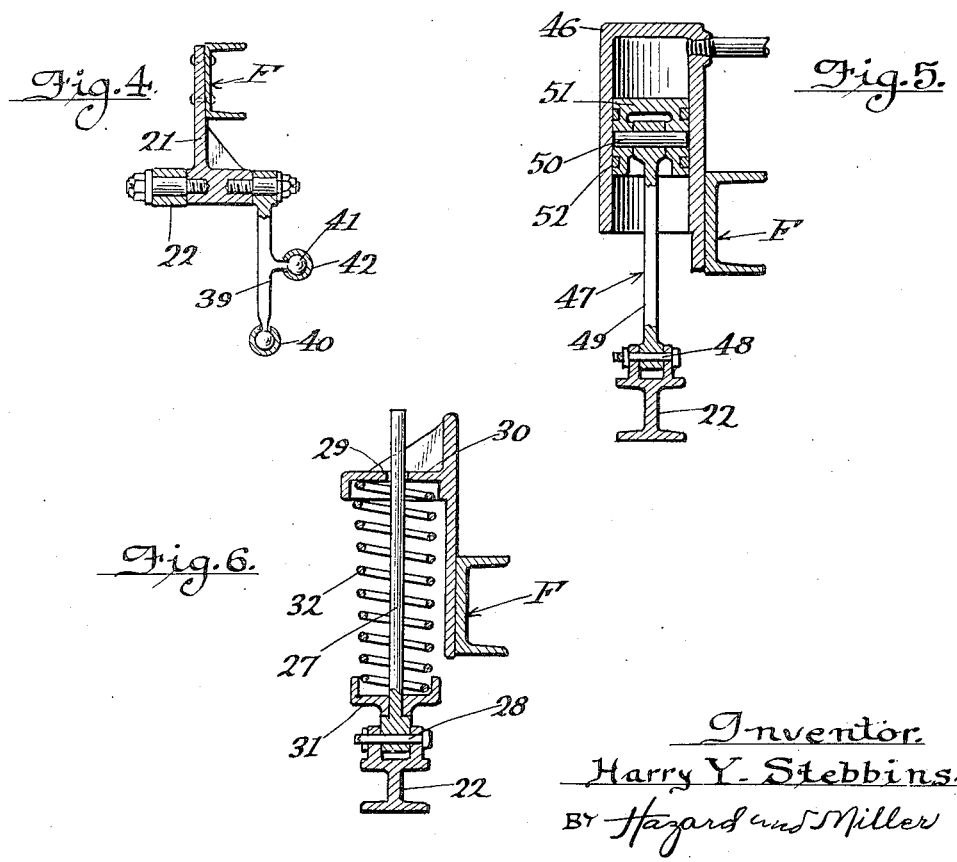

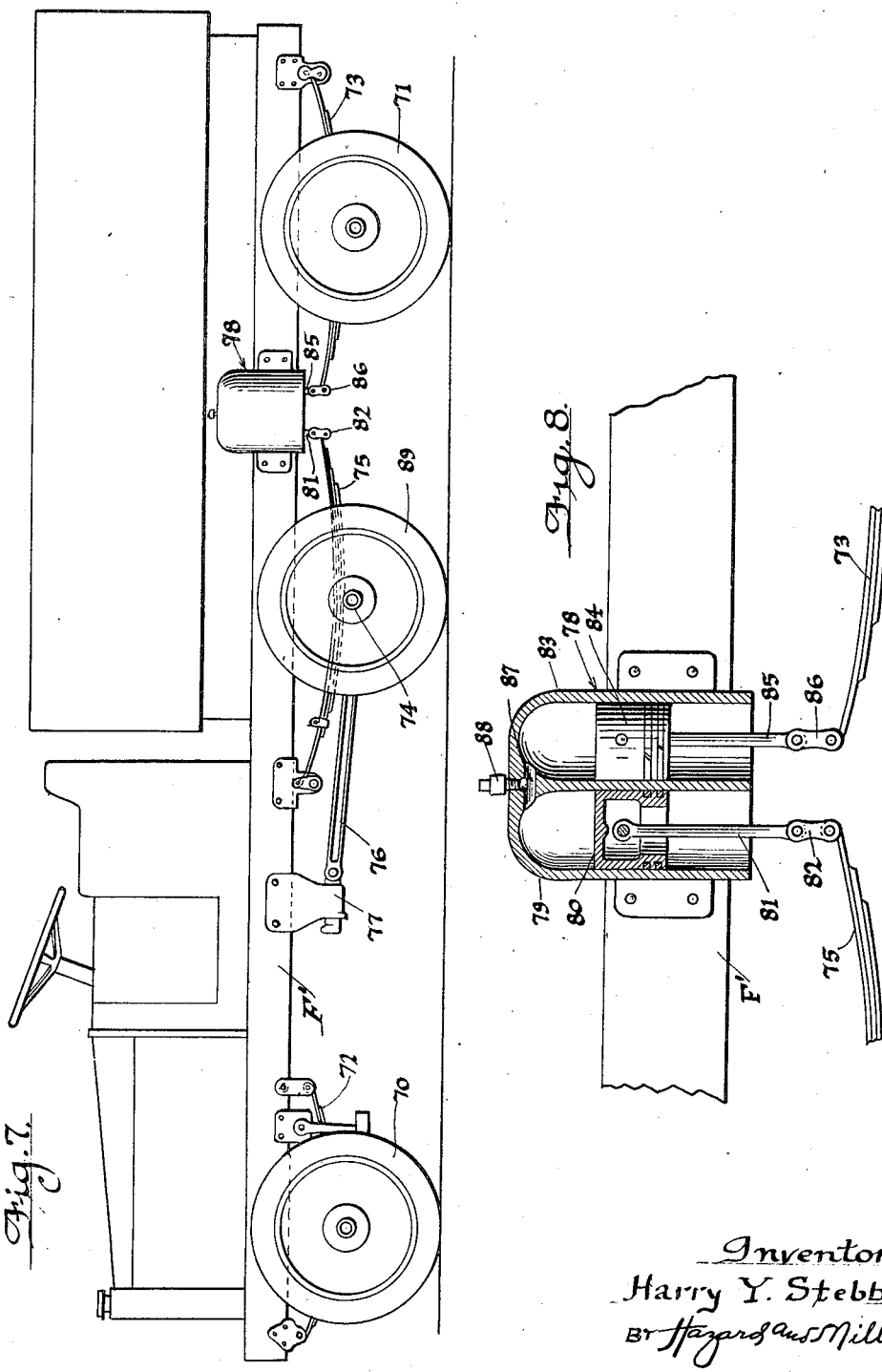

Patented June 26, 1928.

1,674,805

UNITED STATES PATENT OFFICE.

HARRY Y. STEBBINS, OF LOS ANGELES, CALIFORNIA, ASSIGNOR TO UTILITY TRAILER MANUFACTURING COMPANY, OF LOS ANGELES, CALIFORNIA, A CORPORATION OF CALIFORNIA.

SIX-WHEEL ATTACHMENT FOR VEHICLES.

Application filed January 30, 1925. Serial No. 5,752.

This invention relates to improvements in vehicles.

It is a broad primary object of the invention to provide an attachment for a vehicle, such as a truck, which shall consist of adding two additional ground wheels, and to provide means whereby these additional ground wheels may be caused to support their proportional part of the load, whereby the capacity of the vehicle may be materially increased.

It is a further object of the invention to provide means whereby the load supported upon all of the ground wheels of a vehicle may be equalized.

A still further object of the invention is to provide an attachment for attaching two additional intermediate wheels to a vehicle, such as a truck, and to provide means whereby these additional wheels may be steered, or turned, upon steering or turning the front wheels of the vehicle.

With the foregoing and other objects in view which will be made manifest in the following detailed description and pointed out in the appended claims, reference is had to the accompanying drawings for an illustrative embodiment of the invention, wherein:

Figure 1 is a top plan view, parts being shown in section, of a truck or vehicle to which the improved attachment has been applied;

Fig. 2 is a side elevation, parts being shown in section, of the vehicle shown in Fig. 1;

Fig. 3 is a detail, parts being shown in section, of a portion of the attachment, which is applied to the truck;

Fig. 4 is a view taken substantially on the line 4—4 of Fig. 3;

Fig. 5 is a detail in section of a cylinder and piston operable therein employed in the equalizing mechanism;

Fig. 6 is an enlarged view showing the spring arrangement for the attachment;

Fig. 7 is a side elevation of a vehicle showing a modified form of construction; and Fig. 8 is a vertical section showing a detail of the modified form of construction.

Referring to the accompanying drawings wherein similar reference characters designate similar parts throughout, the improved attachment is shown as applied to a truck having a front axle 10 and a rear axle 11. Spindles 12 and 13 are pivoted upon the ends of the front axle 10, as indicated at 14. Suitable leaf springs 15 are secured to the front axle 10 and are of any conventional construction, and these leaf springs support the forward end of the frame F of the truck. The front ground wheels 16 and 17 are rotatable upon the spindles 12 and 13 respectively. The rear axle 11 has mounted thereon the rear ground wheels 18 and 19, which constitute the driving wheels for the truck. Springs 20 secured to the rear axle 11 are of any conventional construction and serve to support the rear portion of the frame F. Members 21 are secured to the sides of the frame F and rearwardly and downwardly extending levers 22 are pivoted to these members. The rearward ends of the levers 22 are secured to an intermediate axle 23, which has spindles 24 and 25 pivoted at its opposite ends, as indicated at 26. Intermediate ground wheels I are rotatable upon the spindles 24 and 25. Intermediate the ends of the levers 22 there are arranged suitable pins 27 which are pivoted to the levers as by bolts 28. The pins 27 extend upwardly through apertures 29 formed in plates 30, which are secured upon the sides of the frame F. A suitable cup 31 is mounted about each of the pins 27 adjacent its bottom and a coil spring 32 is compressed between each of the cups 31 and the plates 30. The springs 32 serve to urge the levers 22 together with the intermediate axle 23 and the intermediate ground wheels I downwardly, so that the intermediate ground wheels assume or take on their proportional part of the load of the truck, which may be within the box or body B.

To facilitate steering of the vehicle, I provide means whereby the intermediate ground wheels I may be turned slightly. The truck is provided with a steering wheel 33 which is connected in the conventional manner so as to operate an arm 34 to which is secured a link 35. The link 35 is in turn secured to an arm 36 rigid with the spindle 13. A link 37 connects the forward end of the arm 36 to the forward end of an arm 38 which is rigid with the spindle 12 upon the opposite side of the front axle 10. A lever 39 has its upper end pivoted to the frame F and a link 40 is connected to the link 35 and to the arm 34. Intermediate the end of the lever 39 there is arranged a ball 41, upon which is mounted one end of a link 42. The opposite end of the link 42 is connected to one end of an arm 43 which is rigid with the spindle 24. A transverse link 44 connects the arm 43 with an arm 45 which is rigid with the spindle 25, so that both of the intermediate ground wheels I will be turned simultaneously in the same direction and the same amount. Because of the fact that the forward end of the link 42 is arranged intermediate the ends of the lever 39, the throw of the link 42 will be considerably less than the throw of either of the links 35 and 40, so that rotation of the steering wheel 33 causes turning movement of the front wheels 16 and 17 of a given amount, whereas the intermediate ground wheels I will be turned by the steering wheel 33 only a proportion of this amount. In this manner by a simple adjustment of the lengths of the various links and levers, the turning of the intermediate wheels may be produced simultaneously with the turning of the front wheels by the steering wheel 33, facilitating turning the vehicle.

In order to equalize the load between the intermediate ground wheels I and the rear ground wheels 18 and 19, cylinders 46 are mounted upon the opposite sides of the frame F. Pistons 47 are pivoted to each of the levers 22, as indicated at 48, and these pistons are reciprocable within the cylinders 46. The pistons 47 may be of any conventional construction, consisting of a connecting rod 49 secured to a wrist pin 50 journaled in the opposite sides of the piston 51, which may be provided with piston rings 52, if so desired. Cylinders 53 are mounted upon the frame F above the forward ends of the rear springs 20, and pistons 54, similar in construction to the pistons 47, are reciprocable within these cylinders and have their connecting rods secured to the spring shackles upon the forward ends of these springs. Conduits 55 and 56 lead from the opposed cylinders 46 and communicate with a central conduit 57. In a similar manner conduits 58 and 59 communicate with the opposed cylinders 53 and also communicate with the central conduit 57. A relief cylinder 60 is connected to the central conduit 57 and a piston 61 is reciprocable therein. A coil spring 62 is disposed between the piston 61 and the end of the cylinder 60, which is provided with an aperture 63. The coil spring 62 urges the piston 61 against the fluid disposed within the cylinder 60 and within the conduits. If desired, additional branch conduits 64 and 65 may be connected to the central conduit 57 and these conduits may lead to cylinders 66, which are mounted upon the opposite sides of the forward end of the frame F. Pistons 67 similar in construction to the pistons 47 are reciprocable within these cylinders and the connecting rods of these pistons are secured to the front axle 10. The springs 32 about the pins 27 are preferably nearly as strong as the springs 15 and 20, so that the intermediate ground wheels I will assume their proportional portion of the load.

In the modification shown in Figs. 7 and 8, the vehicle has its frame F' supported upon front wheels 70 and rear wheels 71, which are mounted upon front and rear axles respectively, which axles carry the springs 72 and 73. An intermediate axle, shown at 74, has mounted thereon a spring 75, similar in construction to the springs 72 and 73. Members 76 corresponding to the levers 22 have their forward ends pivoted to brackets 77 which are mounted upon the frame F'. The rearward ends of the members 76 are secured to the intermediate axle 74 and in this manner the members 76 constitute a type of radius rod for maintaining the intermediate axle 74 in proper position beneath the vehicle. Upon each side of the frame F' there is mounted a pair of cylinders 78. The forward cylinder of each pair, indicated at 79, has a piston 80 reciprocable therein, which has its connecting rod 81 pivotally connected to a shackle 82 mounted upon the intermediate spring 75. In the other cylinder 83 there is reciprocable a piston 84 having its connecting rod 85 connected to the spring shackle 86 of the spring 73. A suitable pipe connection 87 connects the cylinders 79 and 83 and this pipe connection is preferably provided with an inwardly opening check valve 88, through which oil or other fluid may be admitted to the cylinders, if for any reason some of the fluid should become lost. A check valve, similar to the check valve 88, may be mounted upon one of the conduits in the device shown in Figs. 1 to 6 inclusive, whereby the supply of fluid within the cylinders and conduits may be kept at the proper amount. If desired, the steering apparatus used in the device shown in Figs. 1 to 6 inclusive may be applied to the device shown in Fig. 7, enabling the intermediate ground wheels 89 to be steered simultaneously with the front wheels 70. In the device shown in Fig. 7, the load in the vehicle is caused to be equalized between the intermediate ground wheels 89 and the rear wheels 71 by means of the fluid within the cylinders 79 and 83 and the pistons 80 and 84 connecting to their respective springs 75 and 73.

By means of the cylinders above their respective axles and the pistons reciprocable therein, the fluid which may be oil or any other fluid transmits the pressure equally to each axle, so that an effective equalizer is provided, which will cause the truck to ride easily and evenly over a bumpy road. If the pressure developed within these cylinders and within the conduits should exceed a given amount, the relief piston 61 within the relief cylinder 60 is forced back against the action of the coil spring 62. The aperture 63 readily permits air in back of the piston 61 to escape from the cylinder 60 or to enter it upon movement of this piston.

From the above it is seen that an improved vehicle attachment is provided which provides an additional axle carrying ground wheels which assume their proportion of the load, that means is provided for simultaneously turning these ground wheels with the front ground wheels of the vehicle, and that means is provided for equalizing the load sustained upon all of the wheels, and, consequently, the ground wheels associated therewith.

It will be understood that various changes in the detail of construction may be made without departing from the spirit or scope of the invention as defined by the appended claims.

I claim:

1. In a motor vehicle, the combination of a frame, a front axle, ground wheels mounted on the front axle for supporting the forward end of the frame, an intermediate axle, a rear axle, ground wheels mounted upon the intermediate and rear axle, laminated springs connected substantially at their midpoint and at the opposite sides of the said frame with the said intermediate and rear axles, means for pivotally securing the said springs at their opposed ends to the said frame, cylinders mounted upon each side of the said frame intermediate the intermediate and rear axles, pistons mounted to reciprocate within the said cylinders, means for pivotally securing the said pistons to the adjacent ends of the said springs, and fluid conducting means for connecting the cylinders together which are on the same side of the frame.

2. In a vehicle, the combination of a frame, an intermediate axle and a rear axle, ground wheels mounted upon the said intermediate and rear axle, spring means secured to the said axles on the opposite side of the said frame, means for pivotally securing the opposed ends of the said springs to the said frame, cylinders mounted on the opposite side of the said frame, pistons mounted to reciprocate within the said cylinders, means connecting the said cylinders with the adjacent ends of the said springs, and fluid conducting means connecting the said cylinders.

3. In a vehicle, the combination of a frame, intermediate and rear axles supporting the rear end of the said frame, ground wheels journaled on the said intermediate and rear axles, means for connecting the said axles with the said frame, and hydraulic equalizing means interposed between the adjacent ends of the said connecting means.

4. A vehicle running gear including a frame, a pair of wheels, a second pair of wheels, one wheel of each pair being disposed on the same side of said frame to the rear thereof, means secured to the frame at one end for supporting each of said wheels, said means having their adjacent ends free, and hydraulic equalizing means interposed between said adjacent ends for equalizing the load carried by said wheels.

5. A vehicle running gear including a frame, a pair of wheels, a second pair of wheels, one wheel of said pairs of wheels being disposed on the same side of said frame to the rear thereof, means pivotally secured at one end to the frame, means for operatively connecting said means with said wheels, and hydraulic equalizing means on the same side of said frame.

In testimony whereof I have signed my name to this specification.

HARRY Y. STEBBINS.